United States Patent
Chen et al.

(10) Patent No.: US 9,797,705 B2
(45) Date of Patent: Oct. 24, 2017

(54) LASER HETERODYNE INTERFEROMETRIC SIGNAL PROCESSING METHOD BASED ON LOCKING EDGE WITH HIGH FREQUENCY DIGITAL SIGNAL

(71) Applicant: ZHEJIANG SCI-TECH UNIVERSITY, HANGZHOU (CN)

(72) Inventors: Benyong Chen, Hangzhou (CN); Enzheng Zhang, Hangzhou (CN); Liping Yan, Hangzhou (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 502 days.

(21) Appl. No.: 14/520,985

(22) Filed: Oct. 22, 2014

(65) Prior Publication Data
US 2015/0046111 A1  Feb. 12, 2015

Related U.S. Application Data

(63) Continuation of application No. PCT/CN2013/070894, filed on Jan. 23, 2013.

(30) Foreign Application Priority Data

Jan. 9, 2013  (CN) .......................... 2013 1 0008466

(51) Int. Cl.
G01B 9/02 (2006.01)
G01B 11/14 (2006.01)
G01P 3/36 (2006.01)

(52) U.S. Cl.
CPC ..... G01B 9/02083 (2013.01); G01B 9/02002 (2013.01); G01B 9/02007 (2013.01);
(Continued)

(58) Field of Classification Search
CPC .................................................. G01B 9/02083
See application file for complete search history.

(56) References Cited

U.S. PATENT DOCUMENTS 6,188,469 B1 * 2/2001 Liou .......................... G01P 3/68
356/28

FOREIGN PATENT DOCUMENTS

CN  1047569 A  12/1990
CN  201837459 U  5/2011
(Continued)

OTHER PUBLICATIONS

Zhang, En Zheng, "Study on a laser interferometer for measuring straightness and its position based on heterodyne interferometry" Master Thesis paper of Zhejiang University of Technology ; Dec. 18, 2009.

(Continued)

Primary Examiner — Manuel Rivera Vargas
(74) Attorney, Agent, or Firm — J.C. Patents

(57) ABSTRACT

The present invention discloses a processing method for laser heterodyne interferometric signal based on locking edge with high frequency digital signal. A reference signal and a measurement signal of heterodyne interferometer, after being processed by photodetector, signal amplifier, filtering circuit, voltage comparator and high frequency digital edge locking module, are transferred to pulse counting synchronized latching processing module, to obtain entire cycle interference fringe numbers and filling pulse numbers in one interference fringe cycle, of the reference signal and the measurement signal; the numbers are transferred to a computer to obtain displacement and speed of a measured object; usage of a high frequency digital pulse signal to lock the rising edge of laser heterodyne interferometric signal can improve the gradient of the rising edge of interference signal and eliminate wrong pulse caused by (Continued)

noises, and improve the accuracy and stability of the processing for the following signals.

2 Claims, 2 Drawing Sheets

(52) U.S. Cl.
CPC ....... *G01B 9/0207* (2013.01); *G01B 9/02067* (2013.01); *G01B 11/14* (2013.01); *G01P 3/36* (2013.01)

(56) References Cited

FOREIGN PATENT DOCUMENTS

| | | |
|---|---|---|
| CN | 103075968 B | 5/2015 |
| JP | 07-043467 A | 2/1995 |

OTHER PUBLICATIONS

Yao, Xi Guo, "Analysis and Compensation of Nonlinear Errors in a Laser Synthetic-wavelength Nanomeasurement Interferometer" Master's Thesis Paper of Zhejiang University of Technology.
Chinese First Examination Report of corresponding China patent application No. 201310008466.1, dated Dec. 3, 2014.

\* cited by examiner

LASER HETERODYNE INTERFEROMETRIC SIGNAL PROCESSING METHOD BASED ON LOCKING EDGE WITH HIGH FREQUENCY DIGITAL SIGNAL

CROSS REFERENCE TO RELATED APPLICATIONS

This application is a continuation of International Application No. PCT/CN2013/070894, filed on Jan. 23, 2013, which claims priority to China Patent Application No. 201310008466.1, filed with the Chinese Patent Office, on Jan. 9, 2013, entitled "LASER HETERODYNE INTERFEROMETRIC SIGNAL PROCESSING METHOD BASED ON LOCKING EDGE WITH HIGH FREQUENCY DIGITAL SIGNAL", which is hereby incorporated herein by reference in its entirety.

TECHNICAL FIELD

The present invention relates to processing method for laser heterodyne interferometric signal and, in particular, to a processing method for laser heterodyne interferometric signal based on locking edge with high frequency digital signal.

BACKGROUND

A laser heterodyne interferometer has advanced features of high measurement speed and accuracy, high anti-interference, low sensitive to the luminous intensity variation and direct traceability to the primary standard of length, etc., therefore, is widely used in the high precision displacement measurement, ultra-precision fabrications and the detection and calibration of the instruments. Signal processing methods for laser heterodyne interferometer displacement measurement can be mainly divided into two types: phase demodulation, achieving phase measurement via measuring the phase difference between a reference signal and the measurement signals with high resolution characteristics; and frequency demodulation, achieving displacement measurement via counting the Doppler frequency directly, which has the advantage of high speed of measurement. In the frequency demodulation of heterodyne interferometric signal, during the achieving of displacement measurement via pulse counting the Doppler frequency directly, the quality of signal has direct affect on the accuracy and stability of the counting, when performing magnification to the processed heterodyne interferometric signal with oscilloscope, it is found that the rising edge of the signal is not ideal: in one aspect, the gradient of the rising edge of the signal is lower, which will lead to inaccurate trigger time of the pulse counting, thereby affecting the accuracy of phase difference detection between the reference signal and measurement signal; in another aspect, the phenomenon of multiple rising edges caused by the interference of noises and high-frequency harmonics will lead to mistaken triggering of the entire cycle interference fringe counting pulse, which will affect the accuracy of the measurement result. Therefore, improvement for the quality of the laser heterodyne interferometric signal becomes a key technical problem to be resolved when improving the accuracy and precision of measurement.

SUMMARY

The purpose of the present invention is to provide a processing method for laser heterodyne interferometric signal based on locking edge with high frequency digital signal. The technology of using the high frequency digital pulse signal to locking process the rising edge of the interference signal can not only improve the gradient of the rising edge of the interference signal, but also eliminate the wrong pulse jumping caused by noises, thereby improving the quality of the interference signal, and resolving the key technical problem which limits the precision of interferometer measurement to be further improved.

The technical solution of the present invention to resolve the technical problem is:

(1) sending, a reference signal and a measurement signal of a laser heterodyne interferometer to a pulse counting synchronized latching processing module after being processed by photodetector, signal amplifier, filtering circuit, voltage comparator and high frequency digital edge locking module, respectively, to obtain entire cycle interference fringe numbers, $N_{ref}$, $N_{mea}$, and filling pulse numbers, $n_{ref}$, $n_{mea}$, in one interference fringe cycle, of the reference signal and the measurement signal;

(2) outputting, by an external clock signal output by an active crystal oscillator, after being processed by a phase locking and frequency multiplying module, a high frequency digital pulse signal with outputting frequency of f to the high frequency signal edge locking module and the pulse counting synchronizated latching processing module; and (3) sending, the entire cycle interference fringe number, $N_{ref}$, $N_{mea}$, and filling pulse number in one interference fringe cycle, $n_{ref}$, $n_{mea}$, of the reference signal and the measurement signal to a computer via serial communication module, to obtain displacement and speed of a measured object according to the following equations:

the displacement of the measured object:

$$L = \frac{\lambda}{2}(N_{mea} - N_{ref})$$

the speed of the measured object:

$$v = \frac{\lambda}{2}\left(\frac{f}{n_{mea}} - \frac{f}{n_{ref}}\right)$$

where: $\lambda$ is the wavelength of laser.

Performing, by the high frequency digital edge locking module, an rising edge locking process to the laser heterodyne interferometric signal using a high frequency digital pulse signal when an rising edge of the laser heterodyne interferometric signal comes, to convert it to a narrow pulse signal with equal high electrical level, wherein the width of the pulse is $\tau = n/f$, n is the number of pulse of the high frequency digital pulse signal.

The beneficial effect of the present invention is:

The present invention uses high frequency digital pulse signal to lock the rising edge of laser heterodyne interferometric signal, which can improve the gradient of the rising edge of interference signal and eliminates wrong pulse jumping caused by noises, and improve the quality of interference signal, without changing of the signal cycle and phase delay of the signal rising edge, thus will not affect the phase measurement of following signals, and ensure the accuracy for processing of the laser heterodyne interferometric signal, and the signal processing method is easy to realize. The present invention is adapted to optimal processing the quality of the interference signal within the interferometer, which improves the accuracy and precision of measurement.

In the Figures:
1. the first photodetector; 2. the first signal amplifier; 3. the first filtering circuit; 4. the first voltage comparator; 5. the first high frequency digital edge locking module; 6. the pulse counting synchronized latching processing module; 7. the active crystal oscillator; 8. the second photodetector; 9. the second signal amplifier; 10. the second filtering circuit; 11. the second voltage comparator; 12. the second high frequency digital edge locking module; 13. the phase locking and frequency multiplying module; 14. the serial communication module; 15. the counting circuit; 16. the locked processing circuit.

DESCRIPTION OF EMBODIMENTS

The following is to describe the details of the present invention with cooperation of the accompanying figures and embodiments.

In the embodiments of the present invention, the light source of the laser heterodyne interferometer is a dual-frequency He—Ne frequency stabilized laser, the wavelength of output laser is 632.8 nm, the frequency difference is 2.26 MHz, and the highest working frequency of the photoelectric detector is 10 MHz, a programmable logical chip (FPGA) with model number of EP2C20Q240C8N is used to implement the processing method for laser heterodyne interferometric signal based on locking edge of high frequency digital signal. The highest internal working frequency of the EP2C20Q240C8N chip can be up to 400 MHz, with the working frequency of IO interface being up to 50 MHz and a phase locked loop provided internally.

Figure 1:
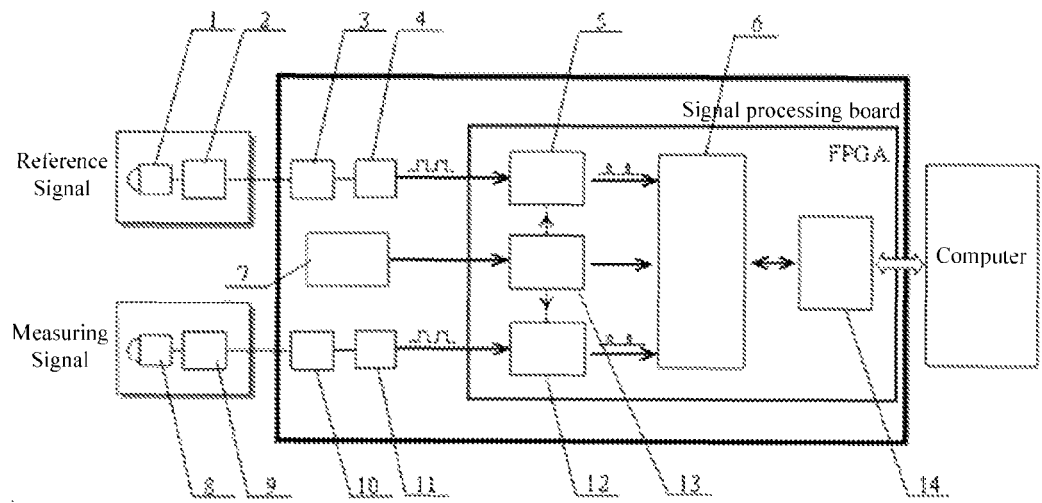
FIG. 1 is a schematic diagram of the present invention.

The specific implementation is as follows:
As shown in FIG. 1, the steps of the processing method for laser heterodyne interferometric signal based on locking edge with high frequency digital signal are:

(1) A reference signal and a measurement signal of a laser heterodyne interferometer detected by a first photodetector 1 and a second photodetector 8 are amplified by a first signal amplifier 2 and a second signal amplifier 9 respectively, the amplified signals are sent to a signal processing board via transmission lines, and then are filtered by a first filtering circuit 3 and a second filtering circuit 10 respectively to filter out the noises interference, after that, they are further transformed from analog interference signal to digital interference signal by a first voltage comparator 4 and a second voltage comparator 11 respectively; a reference digital interference signal and a measuring digital interference signal enter FPGA to a first high frequency digital edge locking module 5 and a second high frequency digital edge locking module 12.

(2) An active crystal oscillator 7 outputs an external clock signal of 50 MHz, which is frequency multiplied 8 times by a phase locking and frequency multiplying module 13 inside the FPGA to obtain a FPGA internal high frequency clocking signal with frequency f of 400 MHz, and this signal is used in one aspect as high frequency digital pulse signal of the first high frequency digital edge locking module 5 and the second high frequency digital edge locking module 12 to perform locking process respectively to the rising edge of the reference digital interference signal and the measuring digital interference signal, and in the other aspect as reference clock signal of a pulse counting synchronization latching processing module 6.

(3) The reference digital interference signal and measuring digital interference signal which rising edges have been locking processed are sent to the pulse counting synchronization latching processing module 6, within which a counting of an entire cycle interference fringe and a counting of a filling pulse within one interference fringe cycle of the reference signal and the measurement signal can be achieved. The counting values of the entire cycle interference fringe of the reference signal and the measurement signal are $N_{ref}$ and $N_{mea}$, respectively, and the counting values of the filling pulse in one interference fringe cycle of the reference signal and the measurement signal are $n_{ref}$ and $n_{mea}$, respectively, which are transferred to a computer via serial communication module 14, to obtain the displacement and speed of a measured object according to the following equations:

The displacement of the measured object:

$$L = \frac{\lambda}{2}(N_{mea} - N_{ref})$$

The speed of the measured object:

$$v = \frac{\lambda}{2}\left(\frac{f}{n_{mea}} - \frac{f}{n_{ref}}\right)$$

And in the formulas: $\lambda$ is the wavelength of laser.

Figure 2:
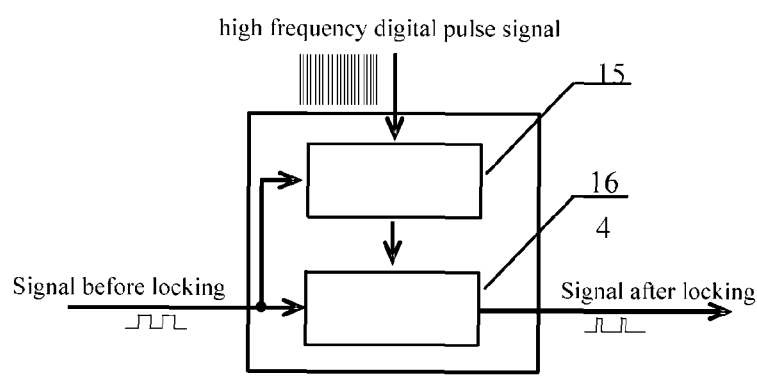
FIG. 2 is a schematic block diagram of a method of for locked processing the rising edge of the interference signal using a high frequency digital pulse signal.

As shown in FIG. 2: a schematic block diagram of a method for locked processing the rising edge of the interference signal using a high frequency digital pulse signal. That is, an further description of the first high frequency digital edge locking module 5 or the second high frequency digital edge locking module 12 in FIG. 1, specifically:

The high frequency digital edge locking module: includes a counting circuit 15 and a locked processing circuit 16. The shaped digital interference signal (the signal before locking) is sent to the high frequency digital edge locking module, and at the time when the rising edge of digital interference signal comes, the locked processing circuit 16 first locks the digital interference signal input into high level, and simultaneously the counting circuit 15 perform pulse counting to the high frequency digital pulse signal, and triggers the locked processing circuit 16 to lock the digital interference signal at low level again when the counting value reaches a preset threshold value of n, in such way, the original digital interference signal is output in a state of locking into a narrow pulse signal with equal high electrical level (the signal after locking).

Figure 3:
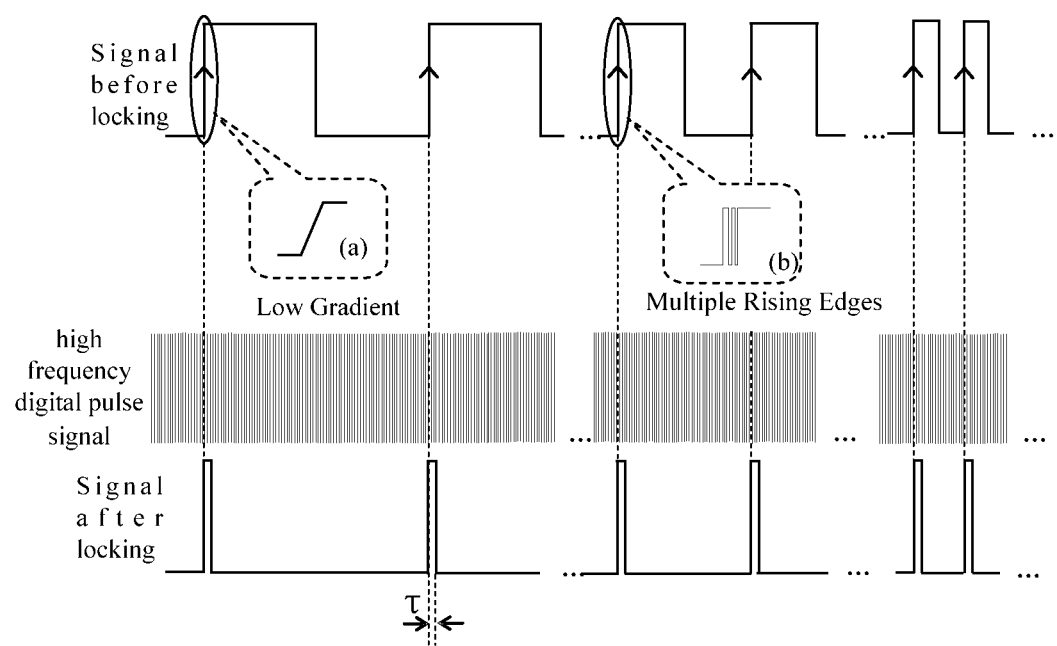
FIG. 3 is a waveform schematic diagram of a method for locked processing the rising edge of the interference signal using a high frequency digital pulse signal.

As shown in FIG. 3: a waveform schematic diagram of a method for locked processing the rising edge of the interference signal using a high frequency digital pulse signal. The rising edge of the shaped digital interference signal (the signal before locking) has the problems of lower gradient and multiple rising edges, as shown in FIG. 3(a) and FIG. 3(b), these problems will affect the phase measurement accuracy of the interference signal and will bring a wrong counting of the pulse in entire cycle. The locking process of the edge with the high frequency digital signal performed by the high frequency digital edge locking module can demodulate the input digital interference signal (the signal before locking) into the narrow pulse signal with equal high electrical level (the signal after locking) under the role of the high frequency digital pulse signal, the pulse width of the signal is $\tau$, where $\tau=n/f$, and n is the pulse number of the high frequency digital pulse signal (the preset threshold value). The frequency of FPGA internal high frequency clock signal is 400 MHz, while the minimum width of high level pulse of the signal after locking processed can reach up to $0.5^{-8}$ s. Such locking edge method with high frequency digital signal can significantly improve the gradient of the rising edge, eliminate multiple rising edges, and improve the stability and accuracy of the process of interference signal, which is helpful for the laser heterodyne interferometer to perform the displacement measurement with high speed and high accuracy.

As stated previously, with the processing method for laser heterodyne interferometric signal based on locking edge with high frequency digital signal, the precision displacement measurement of the measured object with highest velocity about 2.4 m/s by laser heterodyne interferometer can be achieved when the wavelength of laser is 632.8 nm, the frequency difference is 2.26 MHz, the highest working frequency of the photodetector is 10 MHz, the internal working frequency of the EP2C20Q240C8N chip is up to 400 MHz, and the working frequency of 10 interface is 50 MHz.

What is claimed is:

1. A processing method for laser heterodyne interferometric signal based on locking edge with high frequency digital signal, comprising of:
   (1) sending, a reference signal and a measurement signal of a laser heterodyne interferometer to a pulse counting synchronized latching processing module after being processed by photodetector, signal amplifier, filtering circuit, voltage comparator and high frequency digital edge locking module, respectively, to obtain: $N_{ref}$, which is an entire cycle interference fringe number of the reference signal; $N_{mea}$, which is an entire cycle interference fringe number of the measurement signal; $n_{ref}$, which is a filling pulse number of the reference signal in one interference fringe cycle; and $n_{mea}$, which is a filling pulse number of the measurement signal in one interference fringe cycle;
   (2) outputting, by an external clock signal output by an active crystal oscillator after being processed by a phase locking and frequency multiplying module, a high frequency digital pulse signal with outputting frequency of f to the high frequency signal edge locking module and the pulse counting synchronized latching processing module; and
   (3) sending, the $N_{ref}$, the $N_{mea}$, the $n_{ref}$ and the $n_{mea}$ to a computer via serial communication module, to obtain displacement and speed of a measured object according to the following equations:

the displacement of the measured object:

$$L = \frac{\lambda}{2}(N_{mea} - N_{ref})$$

the speed of the measured object:

$$v = \frac{\lambda}{2}\left(\frac{f}{n_{mea}} - \frac{f}{n_{ref}}\right)$$

wherein: $\lambda$ is the wavelength of laser.

2. The processing method for laser heterodyne interferometric signal based on locking edge with high frequency digital signal according to claim 1, wherein:

performing, by the high frequency digital edge locking module, a rising edge locking process to the laser heterodyne interferometric signal using a high frequency digital pulse signal when a rising edge of the laser heterodyne interferometric signal comes, to convert it to a narrow pulse signal with equal high electrical level, wherein the width of the pulse is $\tau=n/f$, n is the number of pulse of the high frequency digital pulse signal.

* * * * *